(12) United States Patent
Cornell

(10) Patent No.: US 9,734,305 B2
(45) Date of Patent: Aug. 15, 2017

(54) FUME EXTRACTION DEVICE HAVING SYSTEM FOR VALIDATING CREDENTIALED FILTERS

(71) Applicant: BOFA International Limited, Poole, Dorset (GB)

(72) Inventor: David Lawrence Cornell, Dorset (GB)

(73) Assignee: BOFA INTERNATIONAL LIMITED (GB)

( * ) Notice: Subject to any disclaimer, the term of this patent is extended or adjusted under 35 U.S.C. 154(b) by 26 days.

(21) Appl. No.: 14/177,776

(22) Filed: Feb. 11, 2014

(65) Prior Publication Data

US 2014/0306797 A1  Oct. 16, 2014

(30) Foreign Application Priority Data

Feb. 12, 2013 (GB) .................................. 1302467.4

(51) Int. Cl.
*G06F 21/00* (2013.01)
*B01D 46/00* (2006.01)
*B01D 46/42* (2006.01)

(52) U.S. Cl.
CPC ........... *G06F 21/00* (2013.01); *B01D 46/009* (2013.01); *B01D 46/429* (2013.01)

(58) Field of Classification Search
CPC ...... B01D 46/429; B01D 46/009; G06F 21/00
USPC .................................................. 340/5.8, 5.9
See application file for complete search history.

(56) References Cited

U.S. PATENT DOCUMENTS

| | | | | |
|---|---|---|---|---|
| 5,522,808 A | * | 6/1996 | Skalla | A61B 18/00 604/317 |
| 7,618,483 B2 | * | 11/2009 | Huza | B01D 46/0084 55/481 |
| 7,850,912 B2 | * | 12/2010 | Favuzzi | G01N 1/31 422/509 |
| 8,684,705 B2 | * | 4/2014 | Magoon | G05D 7/0617 210/739 |
| 8,727,744 B2 | * | 5/2014 | Magoon | F04B 23/06 210/739 |
| 9,120,044 B2 | * | 9/2015 | Cornell | B01D 46/446 |
| 2010/0059602 A1 | * | 3/2010 | Chiou | A01M 1/2038 239/70 |
| 2010/0163497 A1 | * | 7/2010 | Bauder | C02F 9/00 210/758 |
| 2011/0211975 A1 | * | 9/2011 | Magoon | G05D 7/0617 417/53 |
| 2012/0000858 A1 | * | 1/2012 | Butler | C02F 1/003 210/741 |
| 2012/0128505 A1 | * | 5/2012 | Braggin | F04B 53/20 417/1 |
| 2012/0145794 A1 | * | 6/2012 | Mieslinger | G06K 19/07749 235/488 |
| 2012/0151889 A1 | * | 6/2012 | Horey | B01D 46/10 55/467 |

(Continued)

*Primary Examiner* — Brian Miller
(74) *Attorney, Agent, or Firm* — Whiteford, Taylor & Preston, LLP; Peter J. Davis

(57) ABSTRACT

A fume extraction apparatus (1) which comprises an identifier module (20a; 20b) capable of communicating a credential signal over an air interface, a receiver (31) for receiving the credential signal and validating the same, the identifier module attached to a removable filter unit (5; 6); and the receiver is secured to a body of the apparatus, which body removably receives the filter unit.

8 Claims, 1 Drawing Sheet

(56) References Cited

U.S. PATENT DOCUMENTS

| | | | |
|---|---|---|---|
| 2012/0187197 A1* | 7/2012 | Masin | G06K 19/07758 |
| | | | 235/492 |
| 2012/0211569 A1* | 8/2012 | Krawczewicz | H01M 10/488 |
| | | | 235/492 |
| 2012/0319815 A1* | 12/2012 | Feldman | G06Q 30/0185 |
| | | | 340/5.8 |
| 2013/0220900 A1* | 8/2013 | Milvert | B01D 35/143 |
| | | | 210/85 |
| 2014/0306797 A1* | 10/2014 | Cornell | B01D 46/009 |
| | | | 340/5.8 |

* cited by examiner

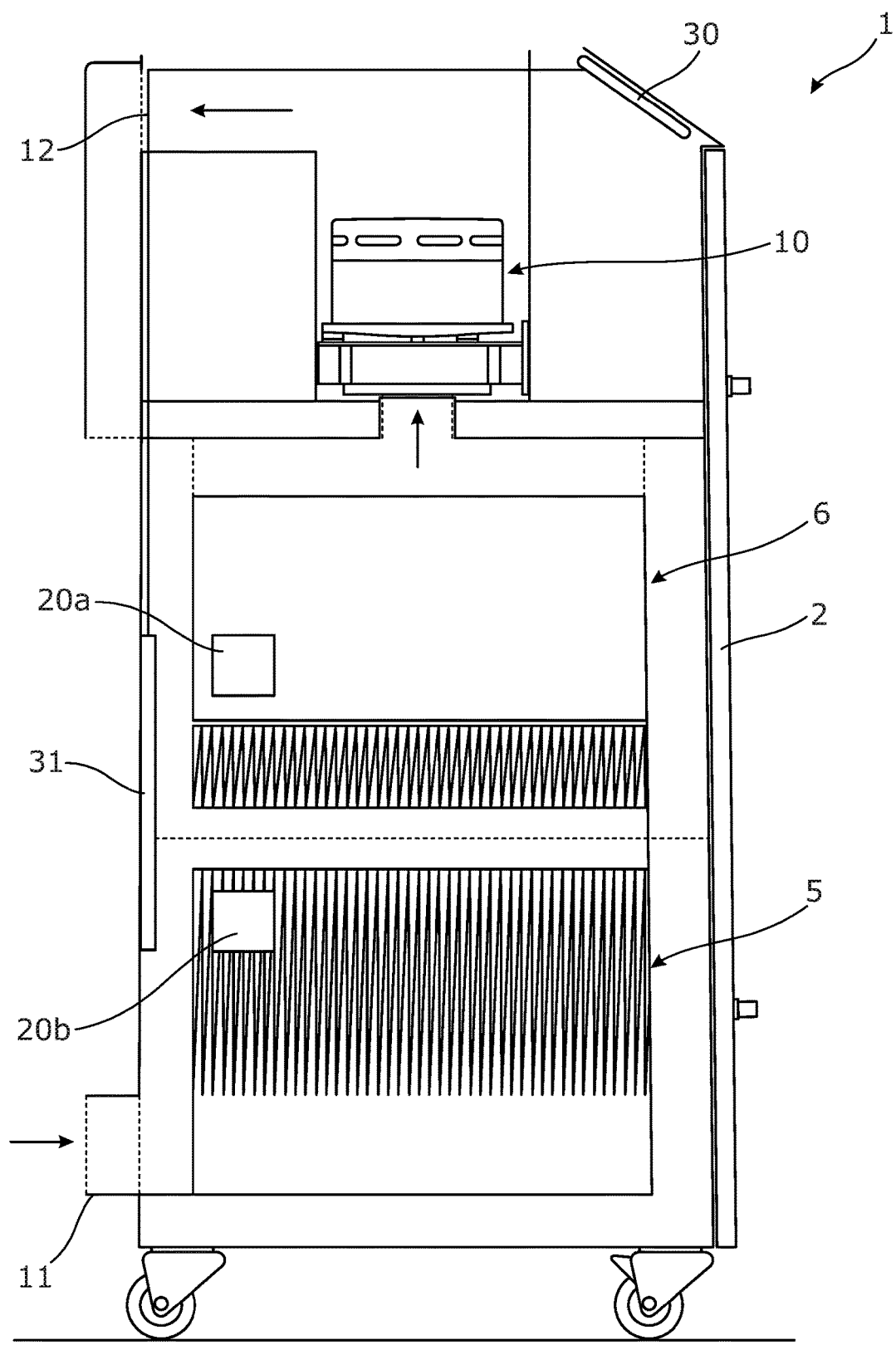

FUME EXTRACTION DEVICE HAVING SYSTEM FOR VALIDATING CREDENTIALED FILTERS

TECHNICAL FIELD

The present invention relates to filter assemblies.

BACKGROUND

In many industries such as electronics fabrication, laser marking/cutting/engraving and pharmaceuticals, extraction systems are used to capture hazardous particulate and gaseous/vaporised matter generated by industrial processes.

Known fume extraction systems comprise multiple graded particulate filters and a gas filter (typically activated carbon based). Which are housed in a single unit, together with an extraction pump. The extraction pump draws contaminants and outputs filtered air into the working area. When saturated, the filters must be replaced.

We have devised an improved filter unit.

SUMMARY

According to a first embodiment of the invention there is provided a fume extraction filtration apparatus including an identifier module capable of communicating a credential signal over a wireless interface, a receiver for receiving and validating the credential signal, in which the identifier module is attached to a removable filter unit, in which the receiver is secured to a body of the apparatus.

According to a first preferred embodiment, the receiver may include a signal processor.

According to a first preferred embodiment, the receiver may include an aerial.

According to a further preferred embodiment the signal processor performs a validation process in which the credential signal is processed to determine whether it corresponds to an acceptable credential signal. If it is a valid credential signal, the apparatus is allowed to be activated, and if the credential signal is determined to be invalid, the apparatus is prevented from being activated.

According to a further preferred embodiment, the signal processor does not allow the apparatus to be activated unless a valid credential signal is received.

According to a further preferred embodiment, the identifier module is a radio frequency identification device.

According to a further preferred embodiment, the filtration apparatus to extracts particulate or hazardous gasses/vapour from the air.

According to a further preferred embodiment, the identifier module is tamper proof such that attempted removal of the module from a filter unit renders the module non-functional.

According to a further preferred embodiment, the filtration apparatus includes an air extraction pump.

According to a further preferred embodiment, the filter unit may include an identifier module capable of communicating a credential signal.

Further features and/or aspects of the invention may relate to one or more features in the description and/or shown in the drawings.

BRIEF DESCRIPTION OF THE DRAWINGS

One embodiment of the invention will now be described, by way of example only, with reference to the accompanying drawing, FIG. 1.

DETAILED DESCRIPTION

With reference to FIG. 1, there is shown a fume extraction filtration apparatus 1. The apparatus 1 comprises a housing 2 which removably receives a first filtration unit 5 and a second filtration unit 6. The apparatus 1 further comprises an extraction pump 10, an inlet 11 and an outlet 12. The extraction pump 10 is arranged to draw air through the inlet 11 and through the first and second filter units.

Each filter unit 5 and 6 comprises a radio frequency identification module or tag referenced 20a and 20b respectively. Each tag 20 is arranged to communicate a credential signal which is indicative of a valid code to allow operational activation of the filter apparatus.

Each of the filter units is arranged to be removably insertable into the fume extraction housing 2. The housing 2 may comprise a rigid cabinet in which is provided a space to removably receive and accommodate the filter units. The housing 2 comprises support components, arranged to support each filter unit.

In use, when the pump 10 is activated contaminated air is drawn through the fume conduit and directly into the chamber 2. The filter 5 may be considered as a pre-filter which protects the downstream High-Efficiency Particulate air (HEPA) filter 6.

The apparatus 1 is arranged to reduce the risks associated with processes that produce hazardous particular and/or gases/vapours (fume). Because the air carrying the fume is returned back into the workplace the integrity of the filters is paramount. The above embodiment ensures that only filters meeting a required quality standard are installed, and are capable of being used for operation. For example if non-genuine filter units are installed, no valid credential is sensed, and the apparatus 1 is prevented from being operated. This prevents non-genuine filter units from being used which may not necessarily meet a required standard.

Advantageously, a particular credential code can be used for operation. For example, if non-genuine filter units are installed, no valid credential is sensed, and the apparatus 1 is prevented from being operated.

Advantageously, a particular credential code can be used for particular customers or particular applications, thus ensuring that the correct type/combination of filters is used. This provides confidence to original equipment manufactures (OEM) customers that the extractor apparatus that they are supplying to control the hazards generated by their equipment (for example lasers) will be effective.

A further important advantage of the apparatus is that if no filter unit is installed, or an insufficient number of filters are installed, in the absence of receipt of a valid credential code, the apparatus cannot be operationally activated. This has very significant safety implications.

In use, the apparatus operates as follows. A control unit 30 system of the apparatus comprises a data processor, a memory and a user interface. The user interface allows an operator to control the operation of the apparatus by way of manual input. The memory is arranged to store one or more valid credential/validation codes, and the data processor arranged to compare a stored credential code with a code received from a tag secured to a filter unit by a receiver with antenna 31. If the sensed credential code is the same as that stored in the memory, the data processor is operative to issue an output which is indicative of allowing the apparatus to be operationally activated. Typically, the sequence of events is as follows. The operator selects a button or similar to provide an input that it is desired for the apparatus to be activated. On receiving the signal, the data processor then performs the above comparison operation to determine whether the request for the apparatus to be activated can be actioned. If the result of the comparison step is positive i.e. there is identity, then a signal can be issued by the data processor to cause the apparatus to be capable of being activated.

The invention claimed is:

1. A fume extraction filtration apparatus which comprises:
an identifier module capable of wirelessly communicating a credential signal,
a receiver for receiving the credential signal and validating the same,
wherein the identifier module is attached to a removable filter unit,
wherein the receiver is secured to a body of the apparatus, which body is configured to removably receive the filter unit;
and wherein the apparatus comprises a control unit connected to the receiver, the control unit comprising a) a memory in which is stored one or more valid credential codes, and b) a processor configured to compare a credential signal received by the receiver from a removable filter unit with the one or more credential codes stored in the memory, and the control unit arranged to perform the comparison in response to receiving an operator-initiated signal to commence operation of the apparatus, whereby the processor is configured to perform a validation process wherein the received credential signal is processed to determine whether it corresponds to an acceptable credential signal, to allow activation of the apparatus if the credential signal is valid, and to prevent activation of the apparatus if the credential signal is invalid.

2. Apparatus as claimed in claim 1 wherein the receiver comprises an antenna.

3. Apparatus as claimed in claim 1 wherein the processor is configured to inhibit activation of the apparatus unless a valid credential signal is received.

4. Apparatus as claimed in claim 1 in which the identifier module comprises a radio frequency identification device.

5. Apparatus as claimed in claim 1 in which the filtration apparatus is arranged to extract particulate or hazardous gasses/vapour from air.

6. Apparatus as claimed in claim 1 in which the identifier module is configured to be tamper proof such that attempted removal of the module from a filter unit to which it is attached causes the module to be non-functional.

7. Apparatus as claimed in claim 1 in which the filtration apparatus comprises an air extraction pump.

8. Apparatus as claimed in claim 1 which is arranged to receive two filter units, and each filter unit provided with a respective identifier module, and wherein successful validation of the credential signals associated with both filter units' identifier modules is required.

* * * * *